June 15, 1937.  H. E. DAYVOLT  2,084,295
HYDRAULIC BRAKE
Filed July 18, 1934  2 Sheets-Sheet 1
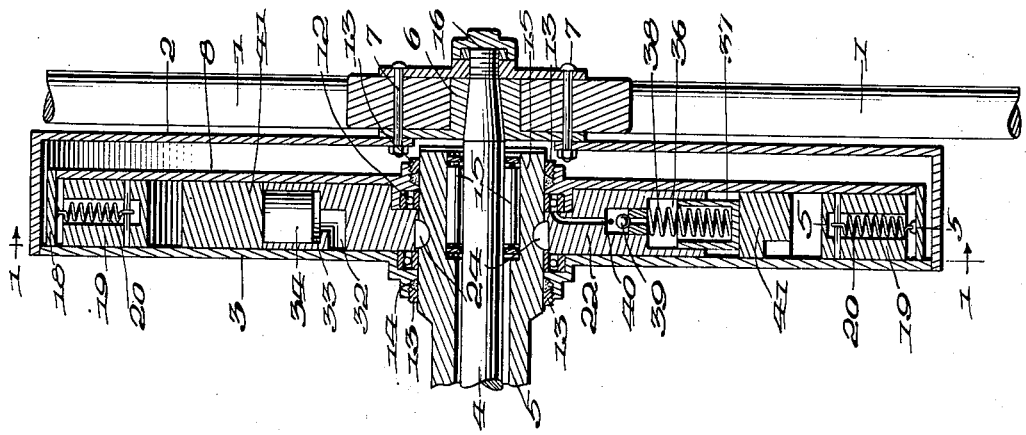
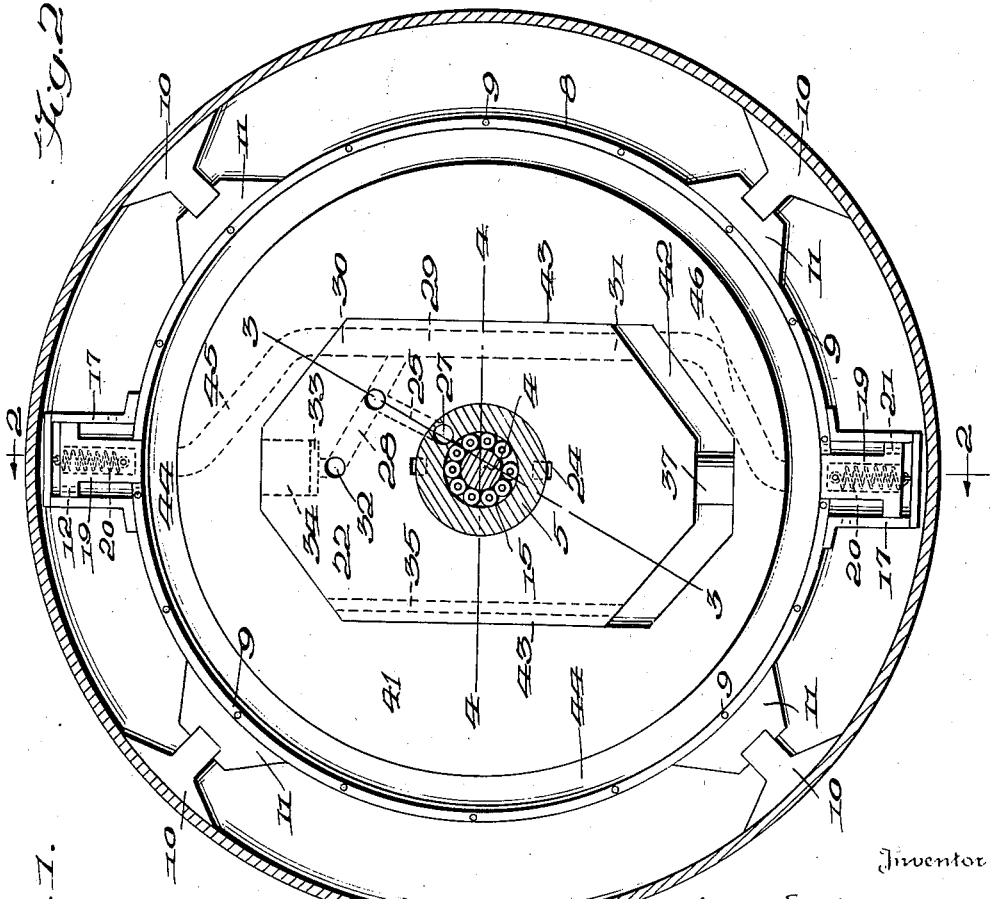
Inventor
Henry E. Dayvolt
By Vernon E. Hodges
Asso. Attorney June 15, 1937.　　H. E. DAYVOLT　　2,084,295
HYDRAULIC BRAKE
Filed July 18, 1934　　2 Sheets-Sheet 2
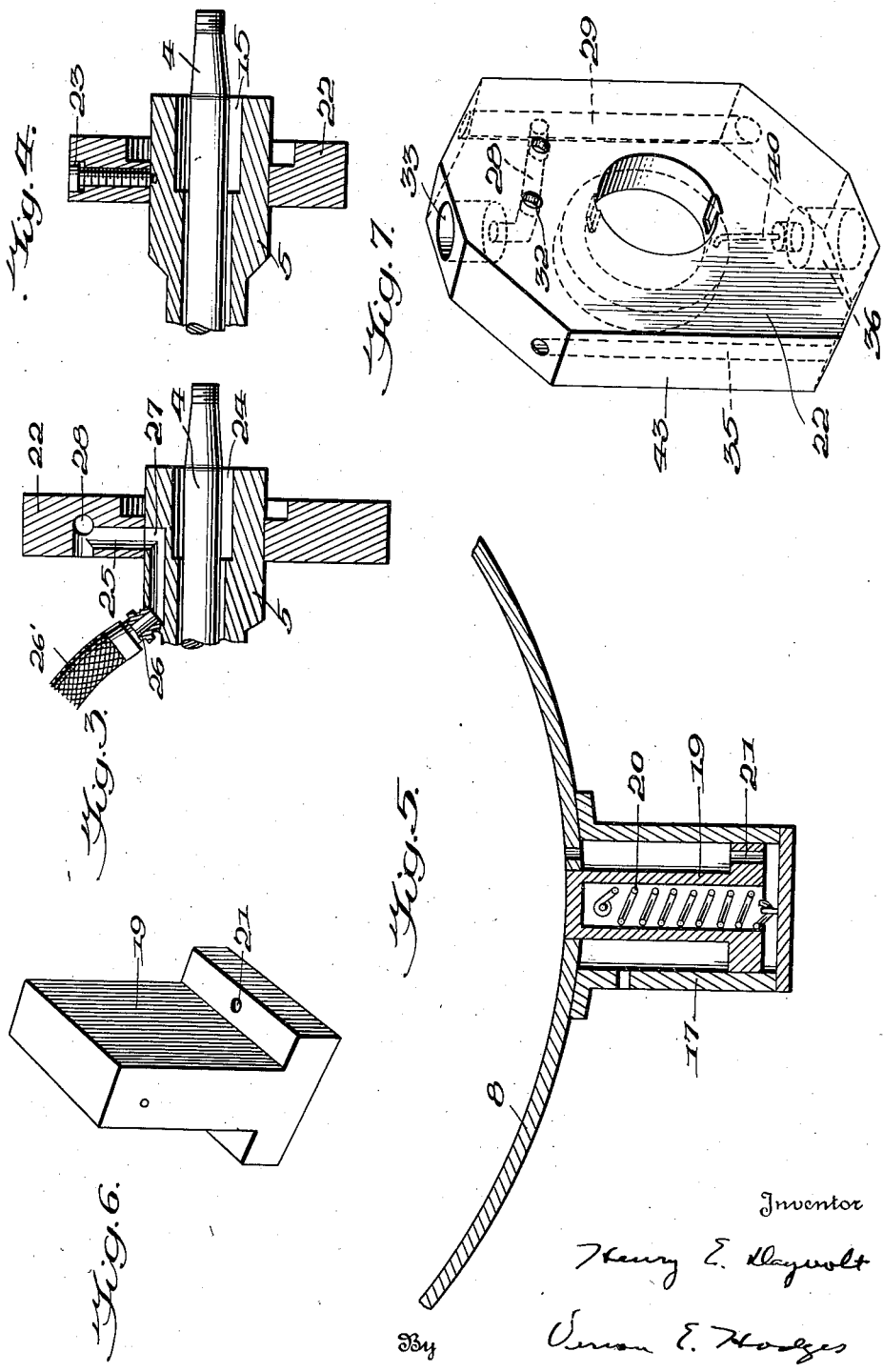

Patented June 15, 1937

2,084,295

UNITED STATES PATENT OFFICE 2,084,295

HYDRAULIC BRAKE

Henry E. Dayvolt, Evansville, Ind., assignor of one-half to Charles F. Lautenslager, Evansville, Ind.

Application July 18, 1934, Serial No. 735,877

4 Claims. (Cl. 188—90)

The object of the present invention is to provide an improved hydraulic brake embodying novel constructions and relationships of elements and a new mode of operation by which the braking action is effected through the action of a liquid, such as oil, according to the relative position of the rotary and stationary elements without the necessity of employing brake shoes, linings, or mechanical friction surfaces such as have heretofore been employed in hydraulic brakes.

The present invention utilizes the principle of rotary and stationary elements with a fluid space therebetween, means for normally maintaining the stationary and the rotary parts in substantially concentric relationship to enable free running of the rotary parts to be had, combined with means for relatively shifting the stationary and rotary parts to change their relationship from that of concentricity to eccentricity by hydraulic action, together with by-pass and fluid-applying and releasing conduits or channels, and other means, whereby locking will be avoided and yet the maximum fluid pressure necessary to properly check the rotating element may be obtained, with adaptability for automatic restoration of the rotary and non-rotary parts to normal concentric relationship when the braking pressure is let off.

The invention is susceptible of modification from the construction hereinafter described and shown in the accompanying drawings, without departing from the essential principles thereof.

The present hydraulic brake cannot become overheated, is reliable in action and, when used with other similar hydraulic brakes on a vehicle, will operate simultaneously and equally in all of the similar brakes employed.

In the accompanying drawings:

Figure 1 is a cross section on the line 1—1, of Fig. 2, the parts being in inoperative or running position;

Fig. 2 is a vertical section on the line 2—2 of Fig. 1;

Fig. 3 is a detail section on the line 3—3, Fig. 1;

Fig. 4 is a similar view on the line 4—4, Fig. 1, showing the set screw which secures the operating block to the axle housing;

Fig. 5 is an enlarged detail section on the line 5—5 of Fig. 2, showing a paddle or vane and the means for its operation.

Fig. 6 is an enlarged perspective view of the paddle or vane shown in Fig. 5; and Fig. 7 is an enlarged perspective view showing the steel block which is rigidly affixed to the axle, and which is shown in detail in Figs. 3 and 4.

My invention is illustrated and will be described as a hydraulic brake for vehicles but it will be understood that it may be put to other uses.

The hub, web, or spokes of a vehicle wheel is shown at 1. An enclosing shell or drum 2 and a plate 3 serve as a housing for the operative parts, the rotary axle appearing at 4 and the stationary axle housing at 5. The axle 4 passes through the hub construction 6 of the wheel. The drum 2 is secured to the spokes or web 1 by bolts 7. The plate 3 and an inner casing 8 are fastened together by bolts 9. The drum 2 and the casing 8 are secured together by interlocking lugs 10, 11 respectively screwed to said drum and casing.

The rotary system thus provided comprises the web or spokes 1 of the wheel, the drum 2, the plate 3, and the casing 8. Ball bearings 12 are interposed between the plate 3 and casing 8 and the axle housing 5. Packing nuts 13 prevent leakage of the fluid contained within the plate 3 and casing 8. In the construction shown it will be understood that packing 14 is held by the nuts 13.

Roller bearings 15 are interposed between the axle 4 and the axle housing 5. Any suitable axle nut 16 may be provided for the axle 4.

Carried by the casing 8 and located between it and the drum 2, are paddle or vane housings 17 having removable ends 18 and containing slidable paddles 19 which are normally retracted into their housings 17 by contractile coil springs 20 located inside the paddles and connected to the removable ends or plates 18. Normally these springs 20 hold the paddles in retracted position but permit the paddles to be projected when a braking action is desired by the pressure exerted on the paddles by oil forced through the ducts 21 in the paddles 19 as will appear hereinafter.

There is a steel block 22 which, as shown in Fig. 4 is rigidly fastened to the axle housing by a set screw 23 and keys 24 so that it is stationary. This block is provided with an internal fluid conduit 25 into which the fluid used in the brake may be forced through an oil hose 26′ leading to the nipple 26 carried by the axle housing 5 via a duct 27, as shown in Fig. 3.

The oil hose 26′ which connects to the nipple 26 leads to any suitable, or usual, oil or fluid applying system, controlled in any manner, such as by a foot pedal, whereby the oil or fluid used in the brake may be forced through the hose into the nipple 26 and into the ducts 27 and 25 when the brake is to be used.

From the duct 25 the oil or fluid may pass into a duct 28 and thence into a duct 29 in the block, said duct opening out through the ends of the block at 30 and 31.

The duct 28 communicates with a port 32 which leads to a cylinder 33 in the block 22 for the purpose of operating a piston 34 which is utilized in a manner appearing hereinafter.

The block 22 also has a by-pass duct 35 extending from its upper to its lower end.

Disposed oppositely to the piston 34 and movable in a cylinder 36 in the block 22, is a piston 37 which is normally forced down as shown in Fig. 1 by an expansion spring 38 for a purpose which will presently appear.

There is provided a one-way relief valve 39 controlling a relief passage 40 in the block 22 which enables the oil or fluid to escape into the bearing 12 when the piston 37 is forced into the cylinder 36 in opposition to the action of the spring 38, as will presently appear.

Located within the casing 8 and plate 3 and shiftable therein in relation to the fixed block 22, is a core 41 which has an opening 42 in which the block is positioned, said block serving as a guide which prevents the core from turning and yet permits it to assume a normal concentric relationship to the casing 8, as shown in Fig. 1, or an eccentric relationship thereto, as when the braking action is to be obtained. The straight edges of the block and core at 43 by their sliding contact, effect the guiding action described.

The piston 37 which is normally held in the position shown in Fig. 1 by the spring 38, and by its contact with core 41 at one end of the opening 42, normally maintains the core in concentric relationship to the casing 8, permitting a free flow of the oil or fluid in the space 44 inasmuch as the blades or vanes 19 are normally retracted by their springs 20 and thus do not project into the space 44.

However, when the brake pedal is operated and oil or fluid is forced into the nipple 26, it has access to cylinder 33 and forces piston 34 outwardly against core 41, shifting the core into an eccentric relationship to the casing 8. The oil or fluid being under pressure, also forces the vanes 19 into the space 44. The shifting of the core is not opposed by piston 37 because any oil or fluid in cylinder 36 will be relieved through outlet 40 to the bearing 12. The piston 37 is positioned within the cylinder 36 without packing-rings so that the spring 38 is sufficiently strong to force piston 37 to the position shown in Figs. 1 and 2 when pressure is released from the space 44.

The core has two ducts 45, 46 which open into its periphery adjacent the vanes 19 and also into the opening or space 42. When the core is in the normal position shown in Fig. 1, the port 45 communicates with the mouth 30 of duct 29 but when braking is being effected, the core then being in eccentric relationship to the casing 8, the duct 46 communicates with mouth 31 of duct 29.

Operation: Normally, no braking action exists, the parts then being in the positions shown in Fig. 1.

When a braking action is desired, the brake pedal (not shown) is operated, thus forcing oil, or the fluid used in the particular system, from the master cylinder thereof into the hose 26', the nipple 26 and ducts 27, 25, 28, 29, space 42 and ducts 45, 46, and into space 44. The oil or fluid is also forced into ducts 21. The vanes 19 are thus forced into space 44 and against core 41.

When the vanes 19 are against core 41, the oil in space 44 must circulate around said core. If the brake pedal is then pressed further, the oil will also enter the duct 32 and pass into cylinder 33 which will result in piston 34 pressing against core 41 and shifting said core from the position of Fig. 1, where it is concentric to the casing 8, to a position eccentric to said casing. The space 42 at the lower part of the opening in the core will then decrease and a similar space will exist above the block 22. The oil space 44 is then reduced in size above the core and results in checking the flow of the oil between the core and the casing 8. If the core 41 is forced clear up to the casing 8, the vehicle wheel will lock as the vanes 19 cannot rotate unless the oil can be forced between core 41 and casing 8 in front of them. Should the braking fluid be applied when the paddles are in the line 4—4, Fig. 1, as the core 41 moves upward, this would reduce the oil space 44 at the top of the vanes and enlarge the space below the vanes and thus the core could not rise unless a part of the oil can escape. To provide for this contingency, the ducts 29, 45, 46, are used. As the space is reduced above the vanes, the oil passes through said ducts and into that part of the space 44 which lies below the vanes. When the core 41 is elevated, reducing the space 42 below the block 22, the oil flows through the ducts 29 and 35 and is received in the corresponding space then existing between the top of the block 22 and the core 41.

When the brake pedal is released, the spring 38 projects the piston 37 and forces the core 41 back to the normal position of Fig. 1. The springs 20 also retract the vanes 19. The wheel may then turn freely, as no braking action exists.

What I claim is:

1. In a hydraulic brake, the combination with a rotary element, of a relatively stationary element surrounded by the rotary element and normally separated therefrom by a space adapted to contain a fluid, a block contained within the relatively stationary element, means carried by the block adapted for normally maintaining the stationary element in a given position in relation to the block and concentric to the rotary element, and means carried by the block adapted to act on the relatively stationary element to shift it in relation to the block into eccentric relation to the rotary element, for braking purposes.

2. In a hydraulic brake, the combination with an outer rotary element, of an inner relatively stationary element, said elements being normally arranged concentric to each other and separated by a fluid space, and a piston and oil ducts contained within the relatively stationary element whereby it may be shifted by hydraulic pressure to an eccentric relationship to the rotary element for braking purposes.

3. In a hydraulic brake, the combination with an outer rotary element, of an inner relatively stationary element normally arranged concentric to the outer rotary element, a stationary block contained within the aforesaid relatively stationary element, said inner element being slidable in relation to the outer rotary element for braking purposes, hydraulically operated means carried by the block for shifting the inner element to eccentric position relative to the outer element by fluid derived from the space between the inner and outer elements, and means carried by the block for restoring the inner element to normal position.

4. In a hydraulic brake, the combination with an outer rotary element, of an inner relatively stationary element normally arranged concentric to the outer rotary element, a stationary block contained within the aforesaid relatively stationary element, said inner element being slidable in relation to the outer rotary element for braking purposes, hydraulically operated means carried by the block for shifting the inner element to eccentric position relative to the outer element by fluid derived from the space between the inner and outer elements, means carried by the block for restoring the inner element to normal position, and fluid by-pass means for the block and for the inner element, said by-pass means communicating with the fluid space between the inner and outer elements.

HENRY E. DAYVOLT.